United States Patent Office 2,778,856
Patented Jan. 22, 1957

2,778,856

REACTION OF ACETALS AND ALKYLENE OXIDES

Raymond I. Hoaglin and Donald H. Hirsh, South Charleston, W. Va., assignors to Union Carbide and Carbon Corporation, a corporation of New York No Drawing. Application March 19, 1952,
Serial No. 277,537

13 Claims. (Cl. 260—615)

This improvement relates to acetals of ether alcohols and a new method of making them by the reaction of an alkylene oxide with an acetal.

Heretofore, the commercially available acetals of the ether alcohols have been made by the reaction of acetaldehyde with 2-methoxyethanol; 2-ethoxyethanol and the like. In carrying out this acetalization reaction, there is obtained an equilibrium mixture comprising the acetal, the acetaldehyde, the ether alcohol and water, a mixture from which the acetal is isolated quite laboriously by a procedure involving prior recovery of unreacted etheralcohol and aldehyde and removal of that water.

The present invention is based on our discovery that ethylene oxide can be condensed with acetals in the presence of Friedel-Crafts type catalysts to form acetals of ether alcohols. Referring to the condensation of ethylene oxide with 1,1-diethoxyethane (acetaldehyde acetal of ethanol) the reaction can be illustrated by the following equations:

$$CH_3CH(OC_2H_5)_2 + (CH_2)_2O \longrightarrow CH_3CH\begin{smallmatrix}OC_2H_5\\OC_2H_4OC_2H_5\end{smallmatrix} \quad (I)$$

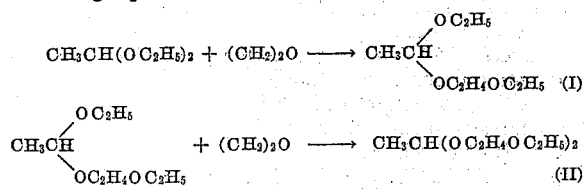

$$CH_3CH\begin{smallmatrix}OC_2H_5\\OC_2H_4OC_2H_5\end{smallmatrix} + (CH_2)_2O \longrightarrow CH_3CH(OC_2H_4OC_2H_5)_2 \quad (II)$$

The primary product that is formed by the addition of one molecule of ethylene oxide to the acetaldehyde diethyl acetal (Equation I) is the mixed acetaldehyde acetal of ethanol and 2-ethoxyethanol. With the primary product of Equation I becoming the starting material of Equation II, the addition of another molecule of ethylene oxide results in the symmetrical acetaldehyde acetal, 1,1-di(2-ethoxyethoxy) ethane (acetaldehyde acetal of 2-ethoxyethanol). The addition of ethylene oxide may be continued to introduce two, three, four or more oxyethylene groups into the acetal molecule. With increasing molecular weight the reaction tends to become sluggish. Compounds of high molecular weight are also less easily obtained than the lower molecular weight compounds because of the conversion of some of the ethylene oxide to acetaldehyde and dioxane by competing reactions. Acetals having not more than four oxyalkylene groups to each chain and not more than eight to the acetal molecule are preferred.

The reaction is conducted by adding the ethylene oxide to the stirred acetal containing a small amount of catalyst. The reaction occurs over a wide range of temperatures. To minimize the formation of products of side reactions, however, a temperature not higher than 60° C. is to be desired, while at temperatures below 0° C. the reaction rate is too slow to be practicable. A temperature from 40° C. to 50° C., approximately, is preferred.

Materials heretofore used for catalyzing a Friedel-Crafts reaction are effective also for catalyzing the condensation reaction of the present invention, as for instance, aluminum chloride, $AlCl_3$; ferric chloride, $FeCl_3$; boron trifluoride, $BF_3$; zinc chloride and the like. An amount which is about 0.05 part to 1 part per 100 parts of the weight of the reactants, by weight, is suitable and is preferred. This particular amount, although preferred, is not highly critical, however, and larger and smaller amounts can also be used with good results. However, with less than 0.005 part of catalyst the reaction rate is too low, and with more than 1 part, there is no commensurate advantage.

Although reference has been had more specifically to acetaldehyde diethyl acetal in the foregoing equations, for purpose of illustration, the invention is not limited to this particular acetal as starting material. The reaction is of general applicability to a variety of acetals, including the orthoformates. Representative of the aldehydes whose acetals can be used as starting materials are the following: acetaldehyde; propionaldehyde; butyraldehyde; 2-ethylbutyraldehyde; hexaldehyde; 3-methoxybutyraldehyde. Representative of the alcohols whose acetals can be used as starting materials are the following: methanol; ethanol; propanol; 2-propanol; 2-methoxyethanol; butanol; 2-ethylbutanol. Acetals having not more than four carbon atoms to the aldehyde group and to each of the alcohol groups are preferred.

In addition to ethylene oxide such other 1,2-alkylene oxides as 1,2-propylene oxide, 1,2-butylene oxide, 2,3-butylene oxide and butadiene diepoxide or mixtures of these 1,2-alkylene oxides can be used in the present invention. This reaction of acetals and alkylene oxides is unusual in that it is one of the very few reactions in which the reactivity of the alkylene oxide does not depend upon the presence of a reactive hydrogen atom. Also, by reason of this invention there are made available reaction products of the acetals which have long been considered to be comparatively inert.

The invention is further illustrated by the examples which follow.

Example 1

Ethylene oxide, 88 grams (2 mols), in vapor form was introduced over a period of 0.5 hour into 572 grams (4.85 mols) of acetaldehyde diethyl acetal contained in a glass reaction vessel provided with a motor driven stirrer, a brine-cooled condenser and a gas diffuser for leading in the ethylene oxide vapor. The reaction mixture also contained, as catalyst, 0.3 gram of boron trifluoride which was added as one gram of a 30 percent solution in diethyl ether. The reaction was conducted at a temperature of 45° C.

After all of the ethylene oxide had been added, the reaction mixture was stirred for an additional hour and the catalyst then neutralized by stirring in an excess of sodium carbonate. The mixture was then filtered and distilled. There was obtained 120 grams of 1-ethoxy-1-(2-ethoxyethoxy) ethane (mixed acetaldehyde acetal of ethanol and 2-ethoxyethanol) having the following properties: boiling temperature at a pressure of 10 millimeters of mercury, absolute, 59–60° C.; specific gravity (20°/15.6° C.), 0.896; index of refraction $(n_D^{20})$, 1.4037. The yield, based on the ethylene oxide, was 37 percent of theory.

In addition, there was obtained 31 grams of 1,1-di(2-ethoxyethoxy)ethane (symmetrical acetaldehyde acetal of 2-ethoxyethanol) having the following properties: boiling temperature at 1 millimeter pressure of mercury, absolute, 64–65° C.; specific gravity (20°/15.6° C.), 0.942; refractive index $(n_D^{20})$, 1.4179. The yield based on the ethylene oxide was 15 percent of theory.

Example 2

Employing a procedure similar to that described in Example 1, 88 grams (2 mols) of ethylene oxide were reacted with 573 grams (4.85 mols) of dimethyl butyral in the presence of 0.05 percent by weight of boron trifluoride added in the form of one gram of a 30 percent solution of boron trifluoride in diethyl ether. The reaction was conducted at a temperature of 45° to 54° C.

There was obtained 136 grams of 1-methoxy-1-(2-methoxyethoxy) butane (mixed butyral of methanol and 2-methoxyethanol) having the following properties: boiling temperature at 10 millimeters mercury pressure, absolute, 65–69° C.; specific gravity (20°/15.6° C.), 0.913; refractive index ($n_D^{20}$), 1.4094. The yield, based on ethylene oxide, was 42 percent of theory.

*Example 3*

Following the procedure of Example 1, 66 grams (1.5 mols) of ethylene oxide were reacted with 534 grams (3 mols) of 1,1-di(2-methoxyethoxy) ethane (symmetrical acetaldehyde acetal of 2-methoxyethanol) in the presence of 1 gram (0.05 percent by weight) of a 30 percent solution of boron trifluoride in diethyl ether. The reaction was carried out at a temperature of 49°–56° C.

There was obtained 82 grams of 1-(2-methoxyethoxy)-1-(2-methoxy-2-ethoxyethoxy) ethane (mixed acetaldehyde acetal of 2-methoxy ethanol and diethylene glycol monomethyl ether)

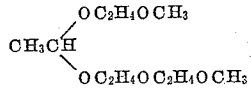

which had the following properties: boiling temperature at an absolute pressure of 1 millimeter of mercury, 79°–85° C.; specific gravity (20°/15.6° C.), 1.005; refractive index ($n_D^{20}$), 1.4260. The yield was 25 percent of theory, based on the ethylene oxide.

*Example 4*

Acetaldehyde diethyl acetal, 413 grams (3.5 mols) was reacted with 101.5 grams (1.75 mols) of propylene oxide in the presence of 0.6 gram (about 0.1 percent) of boron trifluoride added in the form of 2 grams of a 30 percent solution in diethyl ether. The reaction was conducted at a temperature of 50° to 60° C., following the procedure of Example 1. About fifty percent of the propylene oxide was recovered unchanged. There was obtained 26 grams of a mixture of 1-ethoxy-1-(2-methyl-2-ethoxyethoxy)ethane (mixed acetaldehyde acetal of ethanol and 2-ethoxy-1-propanol) and 1-ethoxy-1-(1-methyl-2-ethoxyethoxy)ethane (mixed acetaldehyde acetal of ethanol and 1-ethoxy-2-propanol). The mixture had the following properties: boiling temperature at an absolute pressure of 5 millimeters of mercury, 50°–52° C.; specific gravity (25°/15.6° C.), 0.880; refractive index ($n_D^{20}$), 1.4026. The yield was about 8 percent, based on the propylene oxide.

What is claimed is:

1. A process for making an ethoxyethyl acetal which comprises reacting diethyl acetal with from one to 8 mols of ethylene oxide at a temperature of 0° C. to 60° C. in the presence of a Friedel-Crafts metal halide type catalyst.

2. A process for making a methoxyethyl butyral which comprises reacting dimethyl butyral with from one to 8 mols of ethylene oxide at a temperature of 0° C. to 60° C. in the presence of a Friedel-Crafts metal halide type catalyst.

3. A process for making an ethoxypropyl acetal which comprises reacting diethyl acetal with from one to 4 mols of 1,2-propylene oxide at a temperature of 0° C. to 60° C. in the presence of a Friedel-Crafts metal halide type catalyst.

4. A process for making an alkoxyalkyl acetal which comprises reacting an alkyl acetal with from one to 8 mols of an alkylene oxide at a temperature of from 0° C. to 60° C. in the presence of a Friedel-Crafts metal halide type catalyst.

5. A process for making an alkoxyalkyl acetal which comprises reacting an alkyl acetal with from one to 8 mols of an alkylene oxide having not more than four carbon atoms to the molecule at a temperature of from 0° C. to 60° C. in the presence of a Friedel-Crafts metal halide type catalyst.

6. A process for making an acetal of the general formula

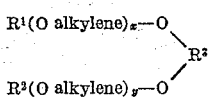

in which $R^1$ and $R^2$ are alkyl groups, $R^3$ is an alkylidene group, each not having more than four carbon atoms to the group thereof, and $x$ and $y$ are integers, not more than 4, which comprises reacting an alkyl acetal of the formula

wherein $R^1$, $R^2$ and $R^3$ are as stated above, with an alkylene oxide containing not more than four carbon atoms to the molecule at a temperature of from 0° C. to 60° C. in the presence of a Friedel-Crafts metal halide catalyst.

7. A process for making an alkoxyalkyl acetal of acetaldehyde which comprises reacting a dialkyl acetal of acetaldehyde with ethylene oxide in the presence of a catalytic quantity of boron trifluoride.

8. A process for making an alkoxyalkyl acetal which comprises reacting an acetal with alkylene oxide in the presence of a catalytic quantity of boron trifluoride.

9. A process for making an ethoxyethyl acetal which comprises reacting diethyl acetal with from one to 8 mols of ethylene oxide per mol of the acetal at a temperature of 0° C. to 60° C. in the presence of a catalytic quantity of boron trifluoride.

10. A process for making a methoxyethyl butyral which comprises reacting dimethyl butyral with from one to 8 mols of ethylene oxide per mol of the acetal at a temperature of 0° C. to 60° C. in the presence of a catalytic quantity of boron trifluoride.

11. A process for making an ethoxypropyl acetal which comprises reacting diethyl acetal with from one to 4 mols of 1,2-propylene oxide per mol of the acetal at a temperature of 0° C. to 60° C. in the presence of a catalytic quantity of boron trifluoride.

12. A process for making an alkoxyalkyl acetal which comprises reacting an alkyl acetal with from one to 8 mols of an alkylene oxide per mol of the acetal at a temperature of from 0° C. to 60° C. in the presence of a catalytic quantity of boron trifluoride.

13. A process for making an alkoxyalkyl acetal which comprises reacting an alkyl acetal with from one to 8 mols of an alkylene oxide having not more than four carbon atoms to the molecule per mol of the acetal at a temperature of from 0° C. to 60° C. in the presence of a catalytic quantity of boron trifluoride.

References Cited in the file of this patent

UNITED STATES PATENTS

| | | |
|---|---|---|
| 2,174,761 | Schuette et al. | Oct. 3, 1939 |
| 2,327,053 | Marple et al. | Aug. 17, 1943 |
| 2,519,540 | Bramwyche et al. | Aug. 22, 1950 |
| 2,527,970 | Sokol | Oct. 31, 1951 |

OTHER REFERENCES

Price: Organic Reactions, vol. III (1946), page 2.